United States Patent [19]

Sawyer

[11] 4,061,089
[45] Dec. 6, 1977

[54] PERSONAL RAPID TRANSIT SYSTEM

[76] Inventor: Elbert Morgan Sawyer, Box 30602, Santa Barbara, Calif. 93105

[21] Appl. No.: 609,787

[22] Filed: Sept. 2, 1975

[51] Int. Cl.² .............................................. B61B 13/08
[52] U.S. Cl. .............................. 104/23 FS; 104/134; 104/148 LM; 310/12
[58] Field of Search ............... 104/23 FS, 134, 147 R, 104/148 R, 148 LM, 144 SS; 310/12, 13; 318/135, 227

[56] References Cited

U.S. PATENT DOCUMENTS

| | | | |
|---|---|---|---|
| 3,443,524 | 5/1969 | Schneider | 104/134 X |
| 3,638,093 | 1/1972 | Ross | 310/12 |
| 3,696,753 | 10/1972 | Ross et al. | 104/23 FS X |
| 3,712,240 | 1/1973 | Donlon et al. | 104/148 LM |
| 3,768,417 | 10/1973 | Thornton et al. | 104/148 SS |
| 3,886,383 | 5/1975 | Ross et al. | 104/148 LM X |
| 3,954,064 | 5/1976 | Minovitch | 104/148 LM X |
| 3,974,778 | 8/1976 | Black et al. | 104/148 LM |

*Primary Examiner*—Lawrence J. Oresky
*Assistant Examiner*—Randolph A. Reese

[57] ABSTRACT

A land transportation system for a vehicle that is supported and guided by air bearings. The vehicle requires no driver or motorman because a guideway determines the direction of travel, except at switch-points in the network. The vehicle is propelled by a linear synchronous motor when on the guideway. The linear synchronous motor primary is embedded in the guideway. A linear inductor alternator provides on-board electric power. A pair of linear induction motors are used to accelerate the vehicle from a station stop up to guideway synchronous speed, to provide a magnetically attractive element to permit switching in guideway tracks, and to provide dynamic braking when stopping at the destination station. No physical contact is required between the guideway and any part of the vehicle while in motion in order to produce tractive effort or for the generation of electric power on board the vehicle to supply auxiliaries such as a motor driving a fan, interior lights, and vehicle-to-wayside communications equipment.

35 Claims, 18 Drawing Figures

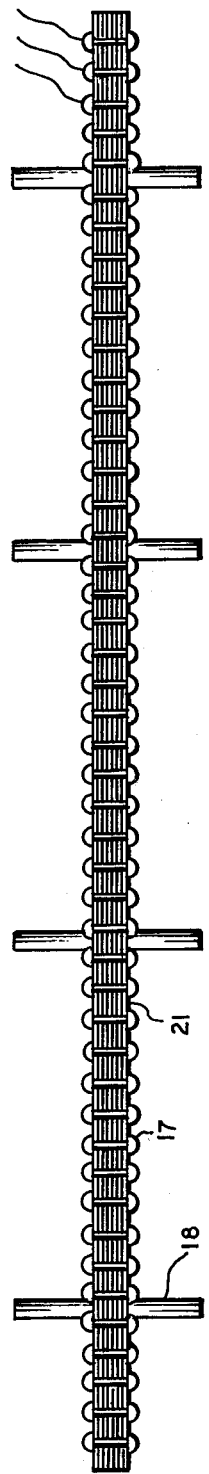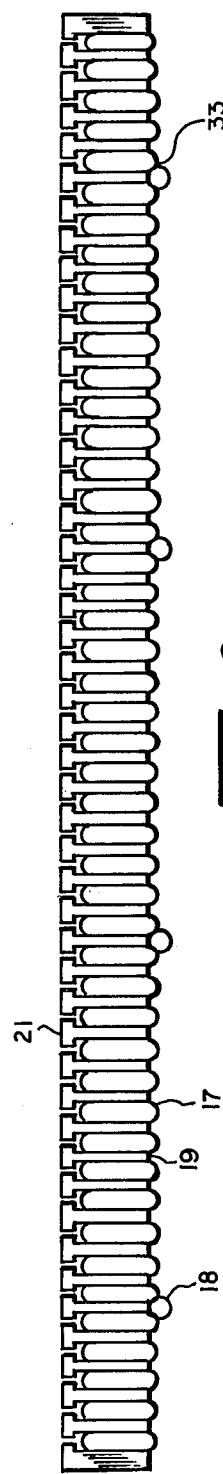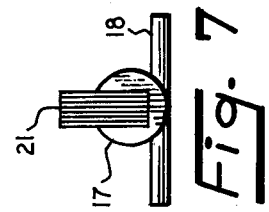

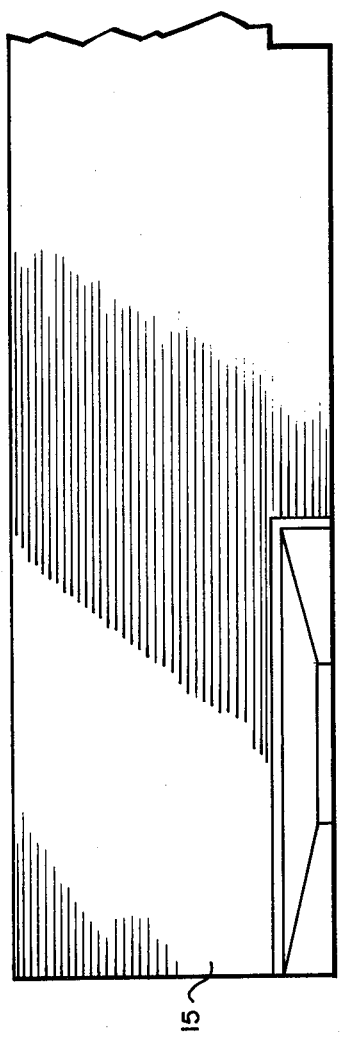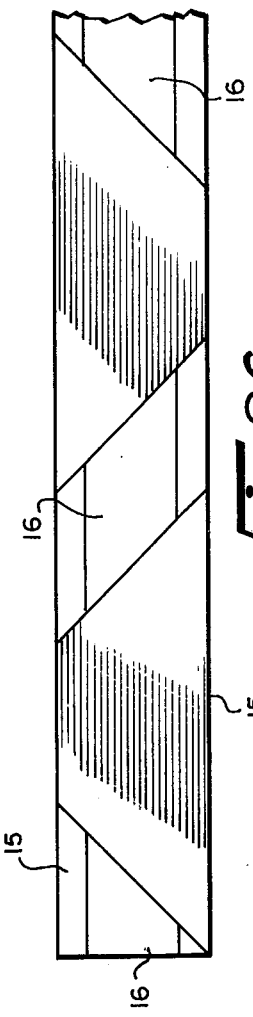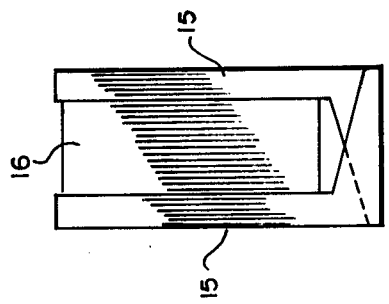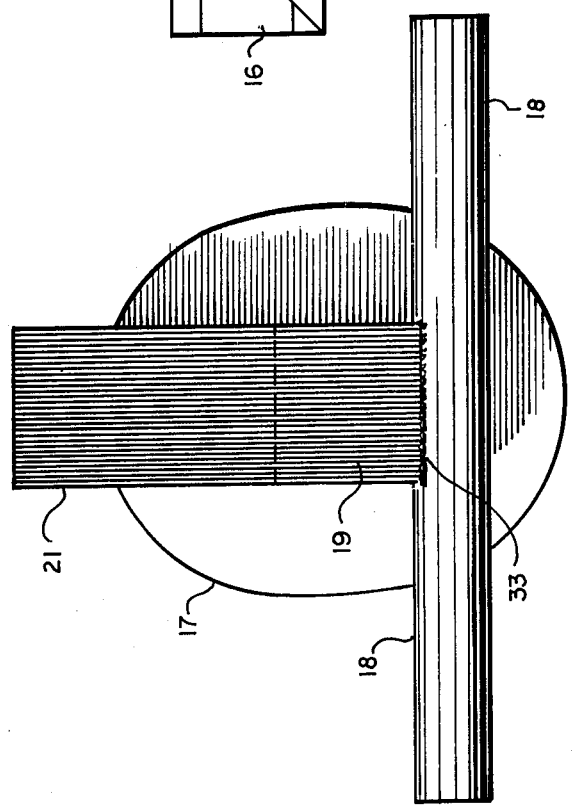

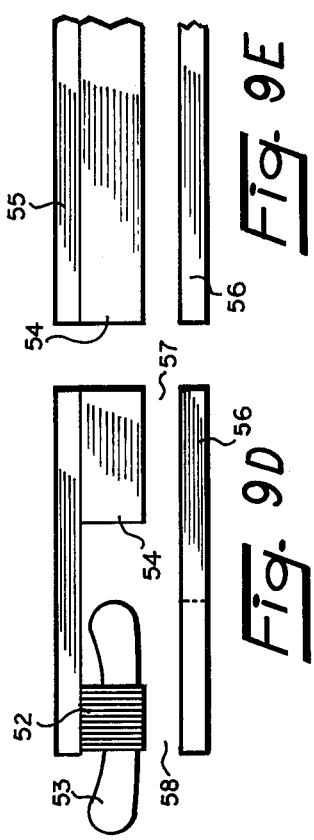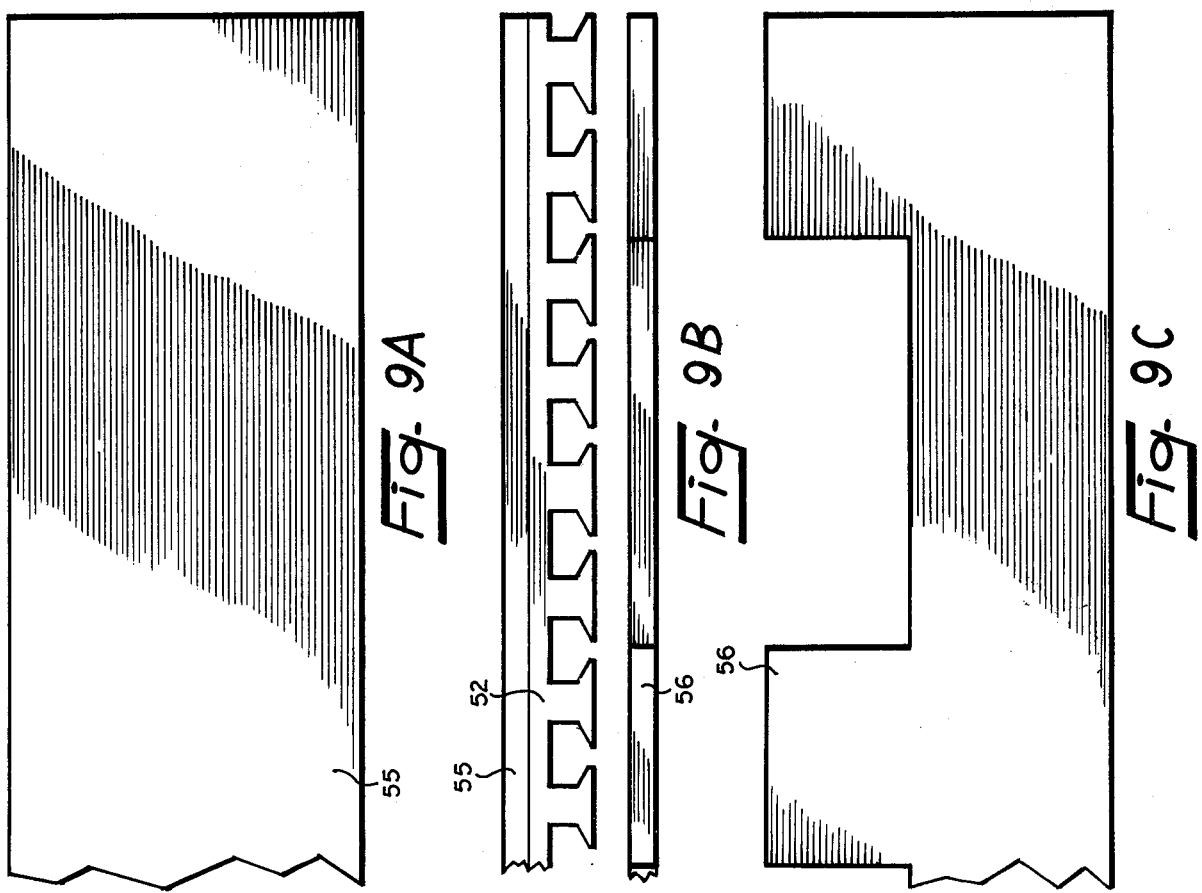

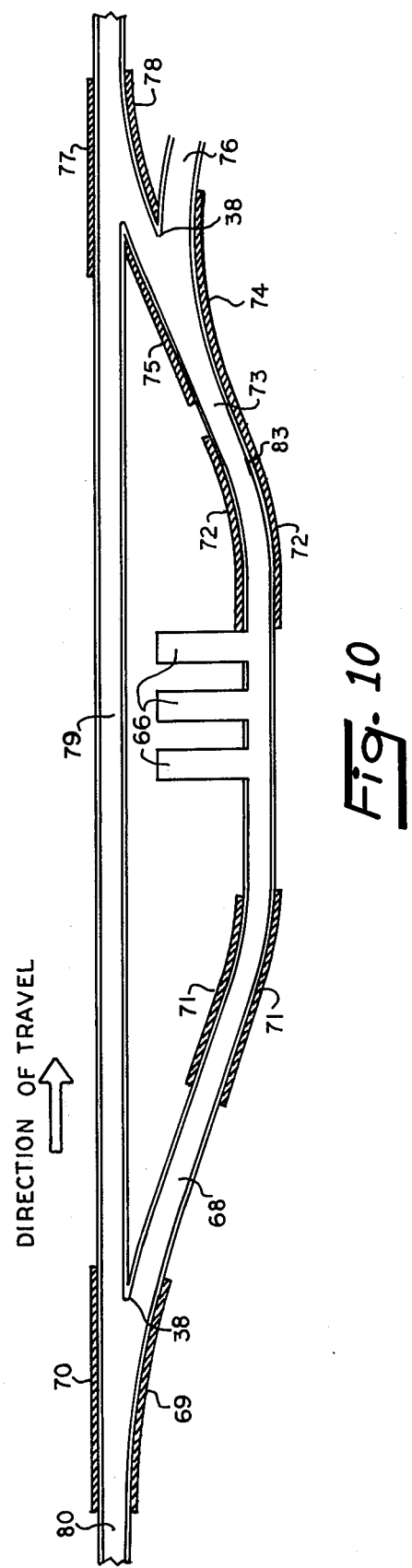

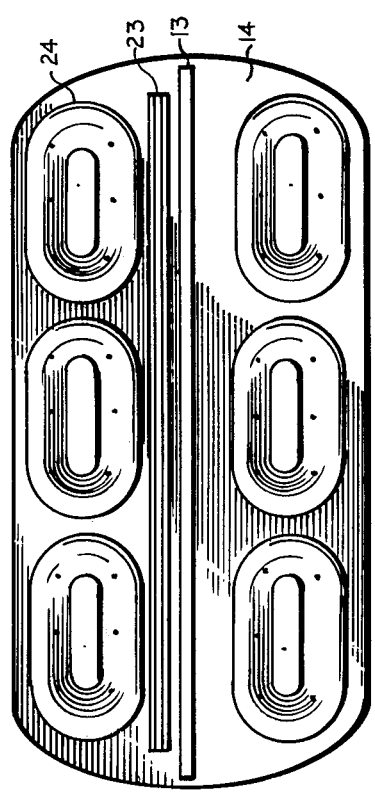

PERSONAL RAPID TRANSIT SYSTEM

REFERENCES CITED

U.S. Pat. Nos.
3,470,827; October 1969, McClean
782,312; February 1905, Zehden
3,385,228; May 1968, Chung
3,225,228; December 1965, Roshala
3,750,803; August 1973, Paxton
3,638,093; January 1972, Ross
3,233,559; February 1966, Smith et al
3,707,924; February 1973, Barthalon et al
3,771,462; November 1973, Barthalon et al
3,768,417; October 1973, Thornton et al

SUMMARY OF THE INVENTION

This invention details a personal rapid transit concept, wherein a linear synchronous motor (LSM) propels a lightweight, four to six passenger vehicle at approximately 20 miles per hour on an elevated guideway. The vehicle is suspended and guided by air bearings. Nothing on the vehicle physically touches the guideway. The linear synchronous motor (LSM), with its primary in the guideway, propels the vehicle at a constant speed. Hence the vehicle can be designed to be essentially passive, devoid of the accessories, sensors, and gadgets that are inherent in other propulsion systems. Such items are parasites that add weight and complexity, compromise reliability and maintainability, and increase costs of not only the vehicle but also the guideway and central computer system. In this concept a linear alternator is the source for vehicle heating, lighting, etc. Total weight of the vehicle loaded is 1740 pounds. Of that weight, 640 pounds is payload. This will accommodate four average-sized adults or any combination of adults and children whose total weight does not exceed that figure.

The "personal" aspect of the now familiar term Personal Rapid Transit (PRT) is primary in this concept. The fact that hundreds of millions of personal automobiles have been marketed to the public is ample evidence that it prefers the size of vehicle adopted in the PRT system described here.

This is a system of "on-demand" vehicles. Linear synchronous motors with the primaries "buried" in the guideway maintain a constant 20 mph in urban areas, with the option in outlying areas to run the same vehicle over a 40 mph guideway. No speed control electronics or computer feedback is required. The vehicle is essentially passive; no third rail power pickups are in the guideway and only the reaction member of the LSM is in the vehicle. Suspension and guidance of the vehicle is accomplished by a type of air bearings presently manufactured for suspension only. Very little equipment is mounted on the vehicle. Power consumption is kept to an absolute minimum, a primary criterion of this concept. The vehicle does not stop or slow down until it reaches the destination chosen by the rider at the starting point. (An "off-at-the-next-stop" button could be incorporated in the vehicle, but not without extra cost and complexity.)

It is therefore a primary object of this present invention to provide a transportation system employing small, light-weight vehicles, propelled efficiently and quietly on an elevated guideway, at a speed which is in synchronism with the traveling magnetic wave set up by commercial electric power.

It is a further object of the present invention to provide a transportation system that is economical to operate in terms of its life-cycle costs. The vehicle travels in an elevated guideway. In relatively open areas the guideway is supported on simple standards. In the city it is above the sidewalk and attached to the building surface. In all cases the terminals are inside a building.

These and other objects, advantages, and details of the present invention will become apparent with reference to the following description taken in conjunction with the drawings wherein:

FIG. 5 is a top view of the LSM stator segment.

FIG. 6 is a side view of the LSM stator segment.

FIG. 7 is an end view of the LSM stator segment.

FIG. 8A is an end view of the LSM motor.

FIG. 8B is a side view of the LSM PM assembly.

FIG. 8C is a bottom view of the LSM PM assembly.

FIG. 9A is a top view of the linear inductor alternator.

FIG. 9B is a side view of the linear inductor alternator, shown without the stator winding for clarity.

FIG. 9C is a bottom view of the guideway portion of the steel plate, notched to produce flux pulsations in the magnetic circuit of the linear inductor alternator.

FIG. 9D is an end view of the linear inductor alternator.

FIG. 9E is an opposite side view of the linear alternator.

FIG. 10 is a diagram of the guideway showing route switching, OFF ramp braking, and ON ramp acceleration elements.

FIG. 12 is a bottom view of the PRT vehicle showing the support air bearings, the LSM permanent magnet field assembly, and the LIA permanent magnet field assembly.

DESCRIPTION OF THE PREFERRED EMBODIMENTS

Figure 1:
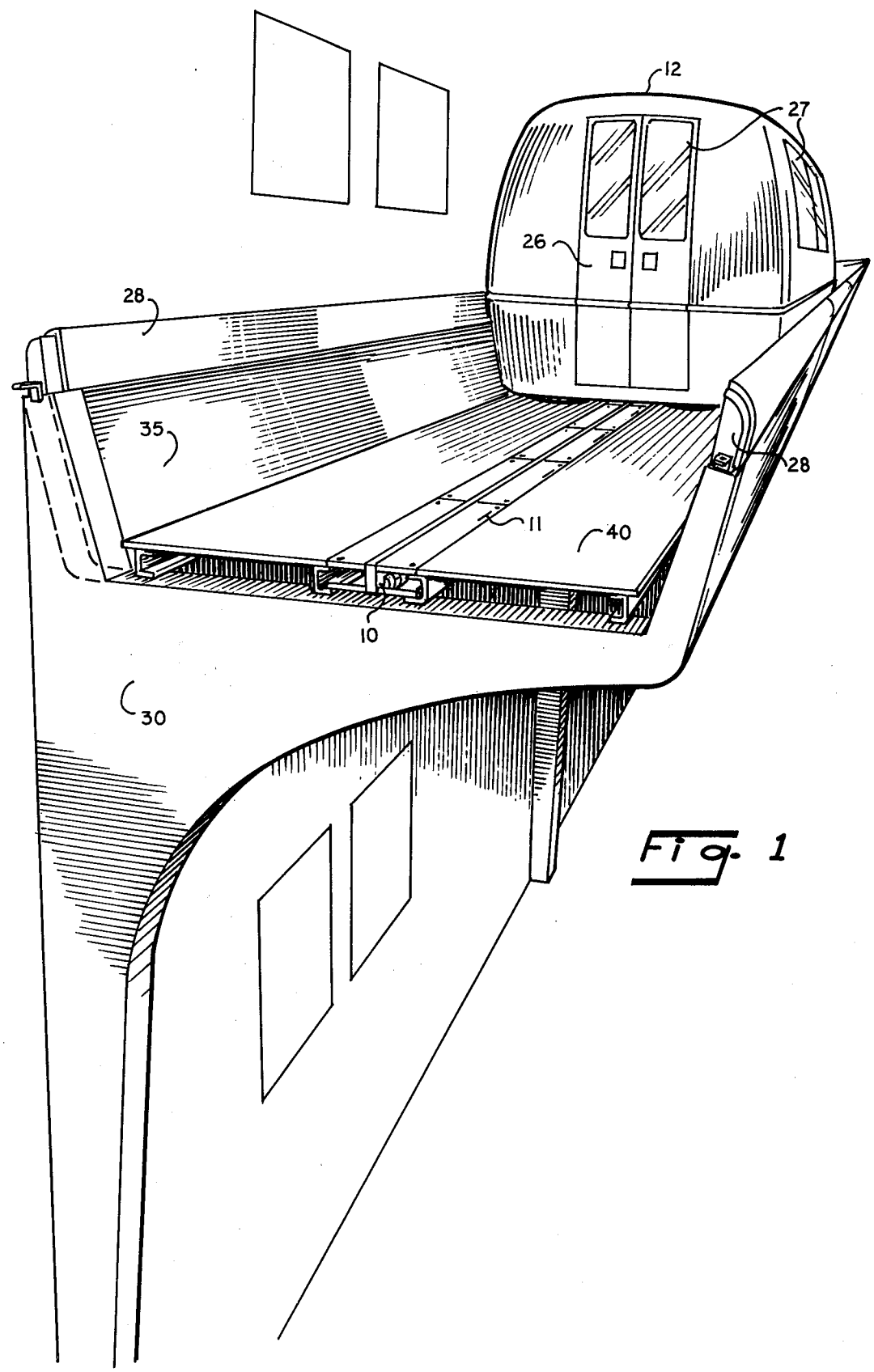
FIG. 1 is a view of several sections of elevated guideway, with a vehicle in position on the guideway.

The LSM primary 10 is buried in the guideway in sections approximately 4 feet long (46.8inches). The LSM primary 10 is made up of parts 21, 18, 17, and 33. Each section is energized only when the vehicle is over that section. A sensor 11 is triggered by the presence of the vehicle 12 and causes a simple power control electronic circuit (see FIG. 4) to put 60 Hz, 230 volts, 3 phase power on the windings. The stator pole pitch is designed to produce a magnetic field that travels at 20 mph (with 60 Hz excitation power).

The LSM field assembly 13 is mounted in the bottom 14 of the vehicle and is twice as long as the stator 10. This field structure can be made by winding wire around each salient pole and energizing the coils with DC current from on board the vehicle. But to save power and to reduce the amount of power required on board the vehicle, a a permanent magnet field structure 13 is used, comprised of a pair of identically formed steel members 15, which provide the saliencies for the north and south poles, by collecting and directing the path of the flux produced by the permanent magnet 16. The tractive effort required for this vehicle is:

| Acceleration | 391.0 | lb | (.255 g) | (1740 lb vehicle, |
|---|---|---|---|---|
| 5% grade | 97.0 | lb | | includes 4 passengers) |
| 2% grade | 44.8 | lb | | |
| Level | 10.0 | lb | | |
| Braking | 391.0 | lb | (.225 g) | |

The acceleration and braking thrust is provided by two large linear induction motor sectors 20, mounted on the sides near the bottom of the vehicle.

The propulsion on the guideway requires 97 lb thrust under worst-case conditions. This is developed by a section of LSM stack 21 that is only 1 inch wide. This small size is a major asset to this concept. A motor section which is 46.8 inches long and 1 inch wide has an air gap area of 46.8 square inches. With a specific tangential force of about 2 pounds per square inch, this LSM segment develops the thrust required for the 5% grade. The LSM stator winding 17 can be wound directly in the stator slots, circling the back iron 19, or depth-below-slot, portion of the LSM stator lamination. This is in a fashion similiar to a consequent pole winding and similar to a Gramme ring winding. In this application it has the great advantages of ease of winding directly in place and obviating the necessity for insulation between phases, since said phases do not touch each other. Steel rods 18, or bars, are welded to the underside of the stator laminations stack 21. Said rods serve two purposes; said members mechanically hold the lamination stack 21 together, and provide members which may be used in securing the LSM stator assemblies to the recessed portion of the guideway provided for said assemblies. The linear synchronous motor requirement for zero grade portions of the guideway network could reduce stack width appreciably, but in this concept the 1 inch stack was adopted for all conditions of guideway grade and the surplus thrust of the LSM is used to develop electric power by means of an alternator (see FIG. 9) mounted on the vehicle. This is extremely significant because it enables this PRT system to avoid many of the deficiences of most electric vehicles, that is, hazards due to exposed electric contacts and rails, electromagnetic interference, and maintenance of collector shoes.

By using the 1 inch wide stack on all guideway LSM segments, most of the time the system can employ power fed into the vehicle in auxiliary circuits such as a fan motor 22 for the air bearings 24 & 25, lights, battery charger, etc.

The size and weight of the linear synchronous motor in this concept are:

Guideway segments: (1 × 46.8 × 2.5 inches) = 29.32 lb (28.35 lb steel, 4.07 lb aluminum magnet wire)

Vehicle field assembly (1 × 96.6 × 3.8 inches) = 60.00 lb

Figure 4:
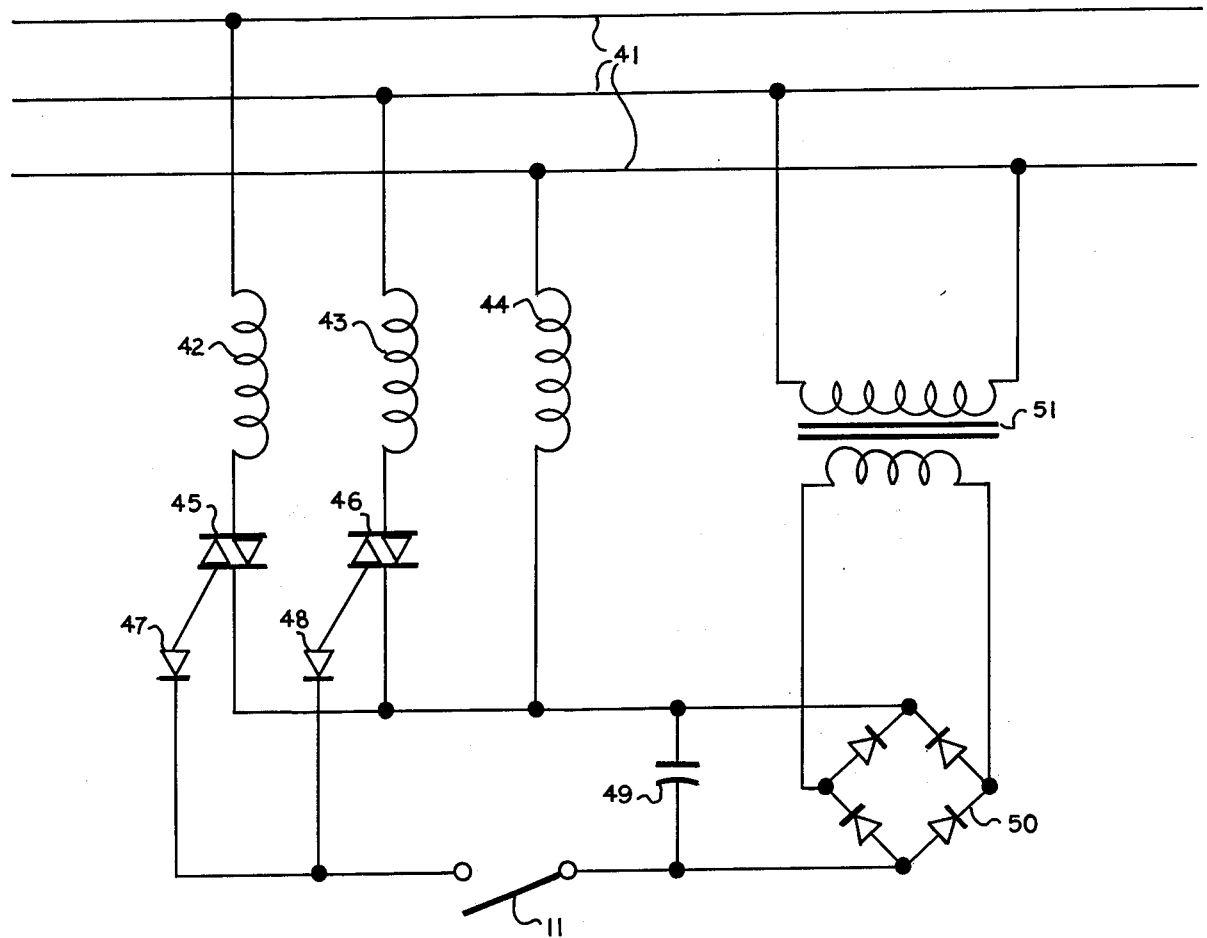
FIG. 4 is the basic electronic control circuit for each segment of linear synchronous motor stator winding.

Control of the LSM is accomplished simply by energizing each section of LSM primary 10 as soon as it is beneath the vehicle. A sensor 11 in the roadbed, triggered by the vehicle 12, turns on the LSM stator segment 10 by using 2 triacs (see FIG. 4). As the next LSM segment in the direction of travel is energized, the previous segment is de-energized. The schematic of FIG. 4 shows how each LSM segment 10 is energized from the commercial power lines 41 as the vehicle 12 passes over it. The circuit acts together like a switch and connects the motor three phase primary windings 42, 43, & 44, which are connected in a wye configuration, across the power lines 41. The vehicle 12 is moving at synchronous speed at the time it is over the LSM segment which is to be energized. This means that the permanent magnet field assembly 13 has induced a counter emf in the LSM phase windings 42, 43, & 44 said emf is at its maximum rms value, nearly equal in magnitude and phase to the power line voltage. Therefore, when the sensor 11, shown as a magnetic reed switch, is actuated by a permanent magnet on the bottom of the vehicle, the LSM windings will be energized as follows:

The step-down transformer 51 produces a low AC voltage, which is rectified by a single phase full wave bridge rectifier 50 and filtered by capacitor 49. When said sensor 11 class DC current passes through the gates of triacs 45 & 46 via diodes 47 & 48, thus making the triacs conductive to AC current as long as switch 11 is closed. This permits normal three phase operation of LSM windings 42, 43, & 44, producing thrust, or tractive effort, on the vehicle 12 as determined by the torque angle of the LSM required to meet the "road-load" resistance and auxiliary load drag torque of the linear alternator.

It is obvious to those skilled in the art, that each triac can be replaced by two SCRs: connected in parallel, but conducting in opposite directions. This arrangement has c higher cost, but has increased current turn-off capability, which can be useful, depending upon the nature of the load.

One of the major advantages of the linear synchronous motor system is the fact that speed control is only required for the acceleration or ON ramps and deceleration or OFF ramps, never on the guideway. This means that no electronic frequency changing or other complex tractive effort control is required for the guideway operation. Under the usual mode of operation, the linear synchronous motor, comprised of two parts 10 & 13, is never required to pull itself up to synchronous speed. The linear induction motors (20) on the sides of the vehicle develop the large tractive effort (391 lb) required for the normal acceleration (0.225 g). However, should a 60 cycle power outage occur, the LSM may be required to have the capability of restarting the vehicle on the guideway. Under such a condition, it is probable that the vehicles have come to rest in positions that are not exactly spaced according to their synchronous slot position before the power failure. This means that the central computer must re-establish spacing of the vehicles by clearing each vehicle to the nearest exit and then restarting the system.

An option in the system that can be implimented to handle the event of a power outage, is to provide for energy storage. Many types of energy storage can be used, such as rotating electrical machinery in combination with a flywheel. Another approach is to use a solid state inverter to generate the three phase power from standby storage batteries. Any storage system would be designed to have enough energy to clear all the vehicles from the guideway and into terminals, while preventing any more vehicles from being introduced on the guideway after a power failure.

The LSM vehicle would have less starting tractive effort under these abnormal conditions of starting up from zero speed on the guideway. This is because the LSM would develop starting torque by using damper windings in the pole faces. This smaller motor 10 would naturally have much less starting torque capability than the LIM on each side of said vehicle said LIMs used as acceleration or ON ramp motors 20.

The damper windings in the pole face of the LSM have two functions: (1) the primary function is damping of the LSM to prevent hunting or losing synchronism and (2) secondarily it provides starting torque for the LSM in event of 60 cycle power interruption on the guideway.

The amount of motor material and control electronics is minimal:
Motor materials per foot: 36.33 lb steel; 4.07 lb aluminum.
Motor electronics control components per foot: two triacs, two diodes, one reed switch, one fractional watt transformer, one single phase diode bridge, and one capacitor.

Motor material (lamination and windings) can be less for level running, if less auxiliary power is provided. Conversely, 5% grade motors can be made larger so that no deficit auxiliary power needs to be extracted from the battery. To eliminate exposed rubbing electrical contacts to "third rails," or catenary wires, the primary of the motor is in the guideway. In keeping with this concept it is necessary to transfer any electrical energy required in the vehicle by non-mechanical means that is, through a magnetic field. There are several possible choices, but the one selected uses a separate generator.

To remove any compromise in the design of a linear synchronous motor, whose performance (tractive effort or specific tangential force) is not influenced by generator action, it is advisable to use a completely separate generator. This means a nearly conventional stator and "rotor" for the LSM with straightforward damper windings. A very unique alternator design is used. The novel method by which on-board electrical power can be generated can be understood by looking at FIGS. 9A, 9B, 9C, 9D, and 9E. The electrical machine can be classed a linear homopolar inductor alternator (LHIA). Up to this point in time, it is probable that one has never been used, of any type, since there has been no need for one. Ordinarilly in a vehicle, there is a driving, or rotating axle, as on a rail car, that can be used to mechanically drive a rotating electrical generator, or alternator, of conventional design. However, in this system there are no rotating shafts which can be used in that manner. The essential parts of the linear inductor alternator are: the lamination stack 52, the stator winding 53, the permanent magnet 54, a magnetically conductive connecting back plate 55, and the notched, magnetic "rotor" plate 56, which is stationary and is mounted flush with the surface of the guideway, and provides part of the structural strength of the guideway.

Figure 11:
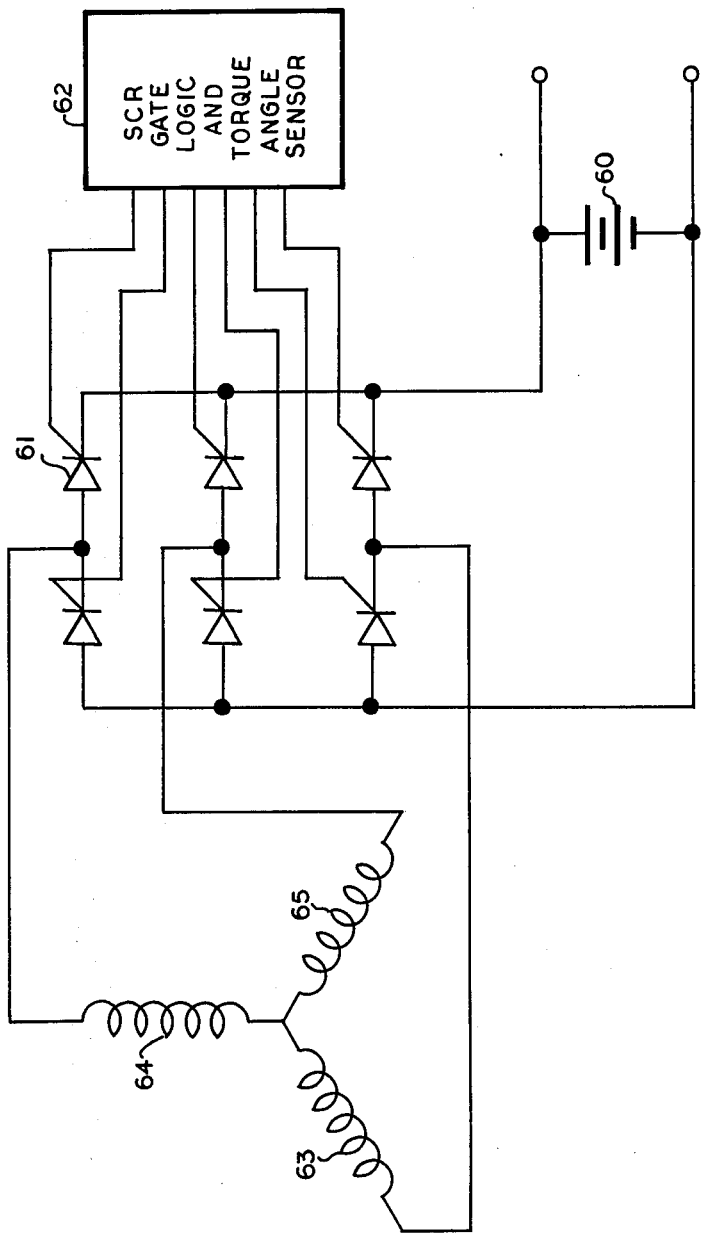
FIG. 11 is a schematic of the permanent magnet excited linear inductor alternator and associated phase delay rectifier, used to regulate the voltage.

In operation, the permanent magnet 54 causes flux to cross the parasitic air gap 57 in a more or less uniform flux density pattern and to be forced laterally through the plate 56 from a uniform cross section into the notched area (see FIG. 9C), which forms the strong concentrations of flux that simulate rotor poles. The flux then crosses the working air gap 58 into the stator lamination 52 which contains a three phase winding 53. Plate 55 completes the magnetic circuit back to the magnet 54. The variation in spatial flux caused by the notches in the plate 56, in conjunction with the velocity of the vehicle 12 which is moving items 52, 53, 54, & 55 relative to the rotor plate 56, causes electrical power to be generated in the windings 53. This electrical power is then rectified, regulated, and used for vehicle loads as described previously. The rectification and regulation are both accomplished by six SCRs, used in a phase-delay-rectifier (PDR) configuration. (see FIG. 11) The LHIA frequency is designed to be higher than the LSM to provide fast PDR response in shedding load.

The power to drive this alternator 23 comes from the guideway LSM 10 & 13. The energized LSM segment 10 provides the motor thrust to propel the vehicle 12 and the excess thrust for generating the auxiliary power. Under level conditions the LSM has considerable excess capability. (LSM output is 3860 watts)

| Guideway condition | Propulsion power required (watts) | Excess watts available |
|---|---|---|
| level | 397 | 3463 |
| 2% | 1790 | 2070 |
| 5% | 3860 | 0 (use battery) |

The auxiliary loads are budgeted as follows:

| Item | Duty cycle | Watts |
|---|---|---|
| Air bearing fan motor (also provides ventilation) | Continuous | 1330 |
| Interior lights for reading, panel displays, etc. | Intermittent | 100 |
| Communication equipment | Intermittent | 15 |
| Battery charger | Continuous | 25 |
| | Total | 1470 |

The excess of power available (3463−1470 = 1993 watts) under normal conditions, allows a reserve for unexpected loads, or abnormally low power by the motor, and is therefore a conservative design for this approach.

The LHIA output is sized, as in an automobile, so as not to require a current limiting circuit, and with a lead-acid battery 60, floating on the output. (See FIG. 11). However, it is desireable to be able to control the voltage to the battery. Therefore a phase delay rectifier PDR circuit of conventional design is used. The LHIA is designed so that the voltage generated at full load is only slightly more than the desired battery voltage; say 14 volts DC nominal charging voltage for the battery and full-on (no phase-back of the PDR) voltage of approximately 16 volts. Since the LHIA output carries the vehicle auxilary loads normally and since said LHIA produces a reduction in net thrust in the vehicle for propulsion, some interesting possibilities occur.

Assuming 85% LHIA and LSM efficiencies, the kilowatt hours per passenger per car mile are: 0.115 for one passenger and 0.029 if four passengers are present. This is extremely low compared to a subway car, loaded with 68 seated passengers and requiring 0.143 kilowatt hours per passenger per car mile.

It is not the intent of this system to ignore costs and to oversize the entire system, as in many other PRT systems, by designing for wind gusts exceeding 40 miles per hour. Under these conditions, the central computer of the entire network would stop vehicles from being introduced into the network's guideways in high wind areas and furthermore would shunt off to the nearest station, any vehicles that were in danger of being stalled.

Another feature of having the capability of dumping or gradually reducing the parasitic load, due to the LHIA, is the possibility of using this PDR control, in conjunction with either a LSM torque angle sensor or an accelerometer, to reduce "hunting" or oscillations common in synchronous motors. Normal methods of damping the oscillations include: adding inertia (in this case the vehicle mass), or using damper windings in the face of the field poles. In this system, being able to vary the level of the parasitic load on the LSM provides a third "handle" or method to control the situation.

The support bearings 24 are sized to handle a four passenger vehicle, 1100 lb empty, 1740 lb loaded, and allow for a magnetic attraction to the guideway of 500 lb. There are six bearings 24 14 × 28 inches oval shaped, requiring 36 cubic feet per minute of air and approximately 730 watts input power to the on-board motor driving the air pump 22. The motor driving the dual air bearing fans should be a brushless DC motor to obtain long life without the need to replace brushes or resurface the commutator.

Figure 2:
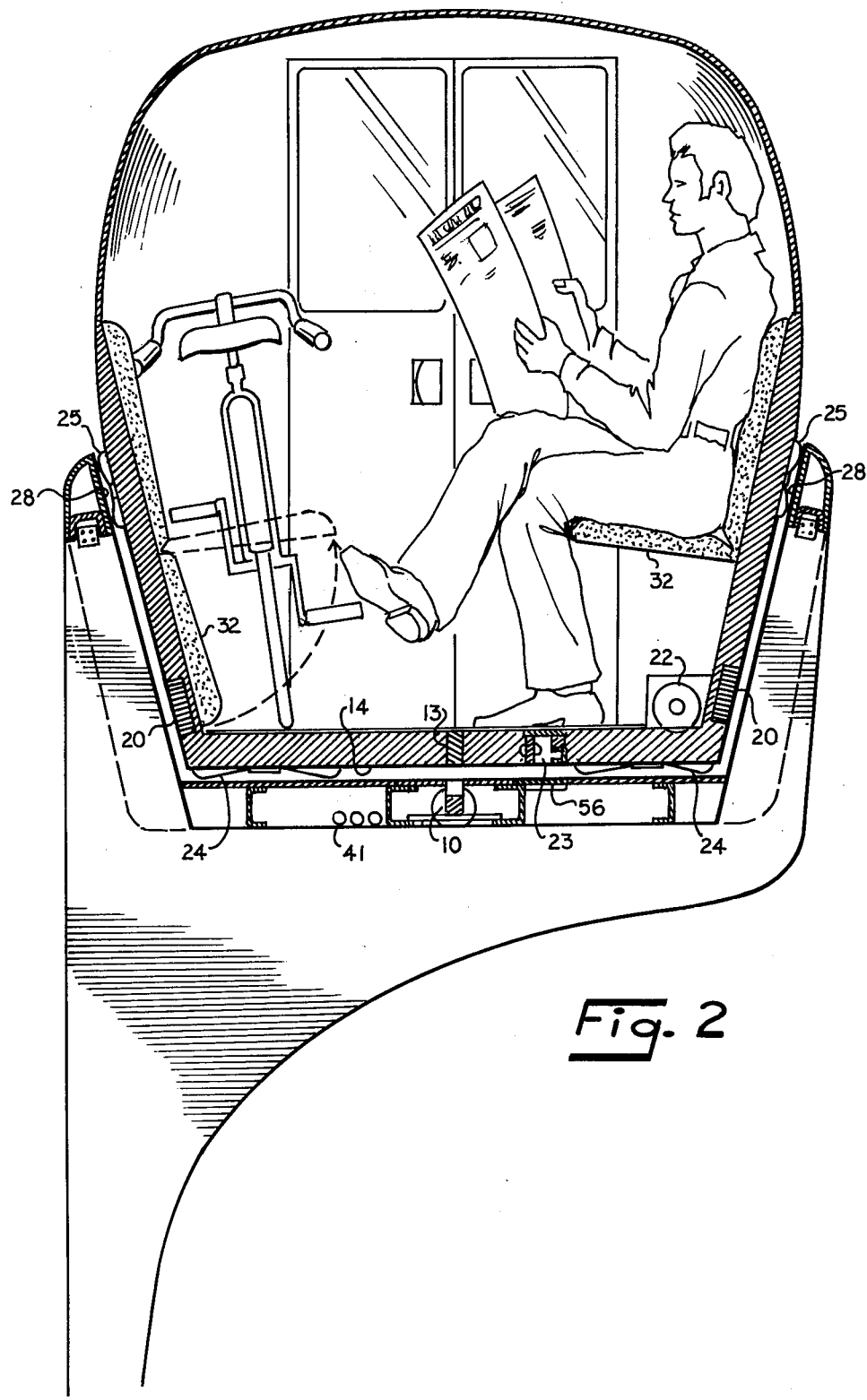
FIG. 2 is a cross-section of the vehicle and the guideway.
Figure 3:
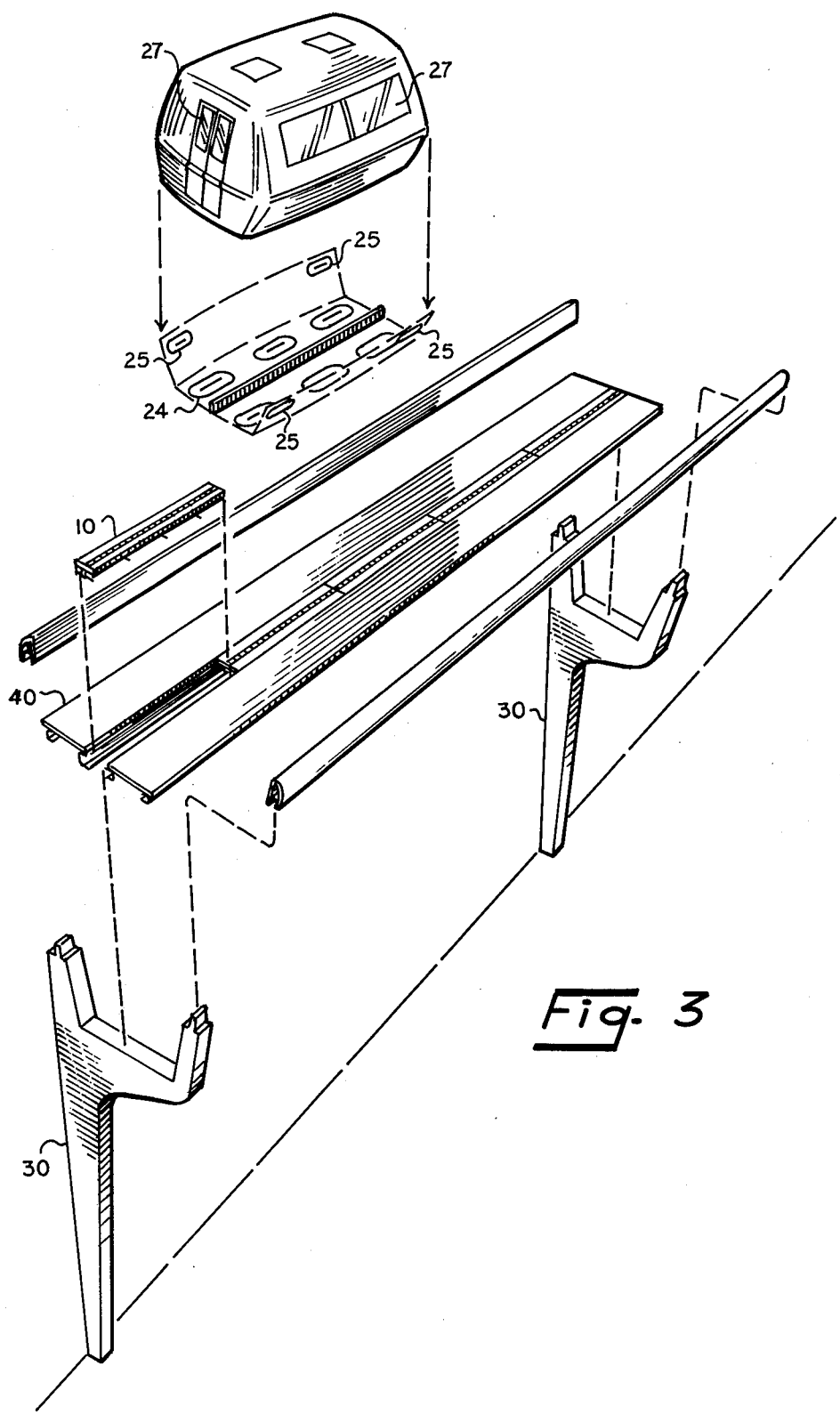
FIG. 3 is an exploded view of one section of the modular guideway and also shows how the air bearings are located on the vehicle.

To guide the vehicle in the lateral direction, four side retention air bearings 25 are used, two on each side, 12 × 24 inches oval shaped. An additional 600 watts is required. Total power for air bearings is 730 plus 600 or 1330 watts. (See FIGS. 2 & 3) for air bearing shape and placement.)

These numbers assume that the guideway surface 40 is relatively smooth. The guideway surface can be painted or epoxy coated to provide this condition and to protect the surface from weather elements.

The basic element in this Personal Rapid Transit system is a very simple, low cost, reliable vehicle. Therefore, the more items that can be eliminated from the vehicle, the better: no complex mechanical guidance mechanism, no wheels, no automatic door closer, etc. Any additional auxiliary electrical loads other than those mentioned will increase the size of guideway LSM segments 10, the LSM field structure 13, and LHIA 23. This concept is designed to carry four passengers at 20 mph with very little horsepower. Hence, items such as air conditioners would have an adverse effect on vehicle size, cost, and reliability, as well as electrical load. Air conditioning, radiant heating, and the like, are not excluded from this PRT system, but they do represent a large cost increase on the entire system due to increased electrical power consumption, larger capital investment (air conditioners, larger LSM for propulsion, larger electronic controls for the LSMs, and larger LHIA and increased system maintenance (largely due to the air conditioners requiring maintenance). In climates that demand it, some of these items may have to be included.

Monocoque construction is utilized as much as possible on the vehicle to maximize interior space and to provide a lightweight but strong vehicle. Doors 26 are located on each end of the vehicle. This retains the shell of the vehicle strength intact, except for windows. The doors must be on the ends, in any event, to permit exit to the guideway in case of power failure to the system. Bench seats fold up or down to provide room for bicycles or wheelchairs.

Unbreakable materials are used for windows 27. This increases passenger safety and reduces system maintenance costs.

Within reasonable limits, the vehicle shape is designed to reduce aerodynamic drag, since this is really the only road load on the wheel-less vehicle. Doors 26 are simple and non-jamming, even under conditions of a stackup of vehicles. The doors 26 do not open outward as in the usual passenger automobile; they are on the inside and slide to the side. An interlock switch prohibits the vehicle from leaving station slots 66 until the two doors 26 are closed.

Although LSM and LHIA permanent magnet fields are shown in the drawings as flush or smooth with the bottom of the vehicle, they would actually have the bottom surface covered with a thin sheet of non-metallic material, such as Teflon, or encapsulated with material to prevent the collection of metallic particles, except on the pole faces. In order to keep the undersurface clean, the ON ramps would contain brushes in the guideway surface to knock off and trap iron particles as the vehicle passes over the brush.

If the permanent magnet field assembly 13 were used as depicted in FIGS. 18A, B, & C without other protection, the pole saliencies 15 would attract ferrous particles, which would eventually build up in sufficient volume to bridge, or partially bridge, between the poles 15 and cause excessive flux leakage, or weakening of the main air gap useful flux, thereby degrading the performance of the LSM. The same reasoning might be applied to the LHIA but because of its different configuration there would be no significant accumulation that would degrade its performance to the same degree as the LSM. Nevertheless both vehicle borne machine elements would be encapsulated or covered at the working air gap with a thin, non-metallic sheet.

The guideway has drains and gutters at the sides to accept water and debris blown there by the support air bearings 24.

The vehicle construction is suitable for passing through a "car wash" without any manual operations required other that closing the vehicle doors 26.

The weight of the vehicle is approximately 1100 lb. The basic elements of the propulsion system on board the vehicle weigh:

| | |
|---|---|
| Linear synchronous motor field | = 85 lb |
| LIM secondary (20)2 × 139 lb (1.25 × 4.25 × 92") | = 278 lb |
| Battery (12 volt automotive; 96A.Hrs.) | = 54 lb |
| Air bearings (6 at 9 = 54) (4 at 7 = 28) | = 82 lb |
| Fans and brushless DC motor (for air bearings & ventilation) | = 26 lb |
| On-board alternator | = 20 lb |
| Total | 545 lb |

This leaves:
1100 lb total vehicle weight empty
− 545 lb propulsion, etc.
555 lb allowable for vehicle structure and seats The linear induction motor secondaries 20 are used as an integral part of the vehicle structure to save weight and to provide vehicle structural strength. (See FIG. 2 in which LIM secondary 20 is shown as part of the vehicle.) The elevated guideway consists of a flat roadbed 40 with attached guide rails 28. The LSM stator segments 10 are buried, flush with the surface of the roadbed and present no obstruction to persons walking on the guideway.

The guide rails 28 offer a surface for the lateral air bearings 25 to react against, and also serve as a hand rail in the event that a short walk on the roadbed 40 becomes necessary. In case of an electrical power failure, passengers exit through the normal end doors 26 on the vehicle and walk safely to the next exit without waiting for someone to rescue them as in a monorail vehicle, or a vehicle energized by a third rail.

The guideway is lightweight and simple in construction because of the light weight and small size of the vehicle. Therefore, the guideway can reasonably be placed in an area where "real estate" is cheap. It is comprised of 20-foot long prefabricated sections (FIG. 3) that are positioned 18 feet above the sidewalk, supported by standards 30 and attached to building walls when prudent. Above the guideway in selected areas a simple roof can be provided to shield the vehicles from debris or missiles dropped from above. However, the roof is not meant to keep out all weather and the guideway is never totally enclosed. Hence, this PRT concept does not have the hazard so common in subway tunnels, that of smoke and fire. Also, the cost of open construction is much less than an enclosed tube. At times the guideway could be at ground level (when alongside freeways, etc.); however, such practice opens a whole new set of dangers unless fences, barriers, etc. prevent cars, persons, and animals from intruding upon the guideway. Therefore, the elevated guideway is safer, and in the long run more economical, since extra barriers, etc. do not have to be provided.

The number of parallel guideways depends entirely upon the traffic density in the area to be served; however, a guideway will nearly always have flow in one direction only. At the extremeties of a system, where flow density is low, it might be practical to have a dead-end line that is short, and carries traffic both ways, but this requires extra central computer effort and slows down the availibility of PRT vehicles at the end of this particular guideway section.

The acceleration thrust, or tractive effort, for this 1740 lb vehicle is 391 pounds, to agree with UMPTA'S edict of acceleration for seated passengers of 0.225 g. With the same specific tangential force of 2. lb/sq. inch as on the linear synchronous motor, the area required is 195.5 sq. inches. This must be doubled, since only half of the material is active at one time on the vehicle (same as LSM). Therefore on each side of the vehicle 196.5 square inches must be provided in the form of a linear induction motor secondary 20. The size selected is 92 × 4.25 inches, running the entire length, except 2 inches at each end of the vehicle. This forms part of the vehicle structure at the bottom. The weight for a 92 × 4.25 × 1.25 inches piece is 139 pounds.

The acceleration ramp 73 requires a small closed loop system (unlike the guideway, which requires no speed control electronics at all) to bring the vehicle up to the synchronous speed of 20 mph and at exactly the right phase so that the vehicle will be able to merge into the guideway in exactly the synchronous slot selected for it by the central computer. If a vehicle does not achieve synchronous speed within a certain period of time, due to some failure, the loop's electronics aborts the merge and the vehicle returns to the station from which it started. (takes 74 instead of 75 & 78, via path 76)

Many methods could be used to control the LIM used for acceleration 72, but in any case velocity and position sensors will determine what the electronics should do to keep the vehicle accelerating properly. These sensors 83 will be in the guideway of the acceleration ramp 73.

The acceleration ramp length is approximately 110 feet long. This allows 55 feet for acceleration, plus 55 feet to stop if the vehicle fails to achieve the proper speed and position on the ramp.

Acceleration ramps are level if possible, to minimize length. A 5% grade requires either a larger LIM (which penalizes every vehicle cost and weight even if only one ramp in the whole system has this incline) or requires a longer ramp length.

The choice of the linear synchronous motor for the guideway constant speed running was explained. This choice was made largely because no computer feedback or power modulation is required for constant speed. By definition, an acceleration ramp is not constant speed. Therefore the choice was open for what kind of motor should provide the acceleration.

The following assumptions were made:

1. Computer control of on-ramp acceleration is required for the vehicle speed during acceleration and the command to the power control of the LIM used for acceleration.

2. The larger force required to accelerate the vehicle also produces a larger attractive force between the vehicle and the stationary guideway LIM stator segments.

The LIMs are conventional (except linear) for the acceleration ramps because:

1. No field power is required; such power would have to be supplied by the vehicle.

2. Straightforward stator segments of conventional linear induction motor type construction can be used.

3. A LSM has no advantage here, since a computer/power control loop is mandatory in any case for ON ramps and OFF ramps.

With the choice of machine type made, it became obvious that for three reasons, these secondary segments of linear induction motors should be placed on the sides of the PRT vehicle:

1. The vertical downward force of attraction could be almost completely eliminated by splitting the LIM in 2 pieces and placing half on each side of the vehicle. As the side wall angle of the vehicle approaches 90° with respect to the guideway horizontal surface 40, the forces on the two sides pull in opposite directions and cancel each other out. Some unbalance is expected and can be tolerated.

2. By placing these LIM segments 20 on the vehicle sides, the bottom area 14 of the vehicle is cleared to permit large, low pressure, air bearings 24 for support.

3. By placing these LIM segments 20 on the sides they can be used for lateral translation forces, such as route switching.

The acceleration ramp LIMs 72 must be excited by solid state inverters; separate inverters for each acceleration ramp segment. Logic circuits send commands to each inverter in sequence to determine the inverter frequency needed for proper acceleration. Vehicles are nominally spaced about 2 seconds apart. The ON ramp length 73 is 110 feet long.

The system must have the capability of "throwing track switches". The guideway, at selected locations, has the ability to "grab" the side of the vehicle near the bottom and hold it to the side wall corresponding to the route path chosen at that switch point. The linear induction motor segments 20, used for acceleration, are now used, one at a time, (right or left side), to move the vehicle in the right or left fork in the guideway.

The side air bearings 25 cannot guide the vehicle at the switch points, since one side wall must be temporarily interrupted. By energizing a LIM stator 69, 70, 74, 75, 77, & 78 in the side wall 35 of the guideway a magnetic pull of far more force than necessary to control lateral movement can be exerted. The lamination in these LIM stators was not illustrated in any of the figures as it is straightforward and common to all those skilled in the art of linear induction motors. The linear induction motor stator attraction must be weaker than the air bearings 25 on that side or the air bearings 25 could be overwhelmed and would bottom-out. Before the fork in the road is reached 80, this LIM stator segment 69 in the guide rail "picks up" the vehicle and maintains continuous attraction around the bend until both guide rails 28 are again present to use in conjunction with the air bearings 25. Then the normal system is re-established automatically as the side-pulling LIM stators 69 are no longer present. During the time the LIM motor 20 & 69 is acting as a magnetic switch it is not producing any forward thrust, since the LIM is moving at synchronous speed due to the guideway LSM 10 & 13.

There are no mechanically moving parts at switch points. All elements are embedded in the guide rails and are protected from weather. Long life under all temperature conditions could be expected and reliability should be extremely high.

Braking is normally required only during OFF ramp 68 operation. For simplicity, the braking will be done by energizing electromagnets 71 in the OFF ramp, with a controllable DC current, to set up eddy currents in the linear induction motor secondary sections 20, on each side of the vehicle. These electromagnets 71 can be wound on exactly the same kind of lamination used for the LIM primary. In this case the stator winding configuration is different from 72 and DC current is used instead of three phase current to set up the flux for the stationary magnetic poles used for dynamic braking. Very large dynamic braking tractive efforts can be obtained in this way. The LSM 10 would be de-energized in the guideway at this time. When the vehicle has slowed to approximately 3 mph, the guideway LSM can be used in the station to accurately position the vehicle and stop it prior to transverse motion for unloading. Reference U.S. Pat. No. 3,470,827 by McClean for explanation of vehicle parallel movement in station concept.

There are a number of reasons why this system should prove to be very safe in operation. One of the most important is that the primary source of electric power is buried cables 41 in the guideway, where there is no possibility of a person contacting the power lines and getting shocked. In case of a system failure, riders can exit the vehicle and walk safely on the guideway, without fear of electrical shock. The on-board electrical system is low voltage (12 or 24 volts) DC and is not high enough to cause electrical shock.

Due to the speed (20 mph) of this system, running into a fixed object on the guideway is much less dangerous than it would be if at higher speeds. Seat belts or padding might be adequate. The vehicle ends could also be designed as energy absorbing crushable structures. Moreover, the fact that propulsion motors are synchronous and vehicle speeds are constant makes vehicle collisions on the guideway much less likely.

At switch points in the guideway ("fork in the road"), the point 38 of possible impact with the guideway structure could also be a crushable structure.

A shelter roof, plastic windows 27, doors 26 locked from within the vehicle, etc. all contribute to protection of the passenger from objects hurled at the vehicle, or entry into the vehicle.

All high density PRT systems, regardless of the propulsion system type, require a computer that can remember where every vehicle is located on the system network and where each vehicle is going. In most proposed systems the vehicles move at a speed commanded by the computer and may or may not be constant. This requires frequent vehicle triggered signals to be fed into the central computer and power control to speed up or slow down. In a linear synchronous motor propulsion system, only periodic benchmarks need to be sent to the central computer, not to verify speed, but only for checking against a failure, in which case the central computer may shut off a portion of the network to further traffic, until the situation is cleared, or shut down the system. By using a linear synchronous motor many guideway sensors are eliminated and central computer memory size and software requirements are reduced.

The PRT system described here is a true synchronous system and would use a control algorithm known as "synchronous slots." The central computer must have the capability to know the instantaneous location of all these "synchronous slots", or "phantom vehicles", as if the synchronous slots were in constant motion, moving at the same speed and with equal spacing between synchronous slots. This method of control has been described in many technical papers in the past few years. The central computer can recognize the proper time to permit the injection of a vehicle onto the main guideway network, via an acceleration, or CN ramp, so that the vehicle injected can make its entire trip in its synchronous slot without conflict with any other vehicle at points of merging traffic and keeping a constant spacing with adjacent synchronous slots, which may or may not have vehicles present. Also many other PRT systems require on-board computers to manage speed commands transmitted to the vehicle. No on-board computer is required in this system.

Probably the most important variation which could be considered to the basic PRT system is that of being able to operate this same vehicle in outlying areas at 40 mph. This can be accomplished by physically doubling the pitch of the poles in the LSM or doubling the frequency of the LSM stator winding excitation. The excitation frequency change method permits leaving the vehicle as is. The three phase frequency can be generated by a motor-alternator set, where the motor is a synchronous motor. Also the higher frequency can be generated by a solid state, three phase inverter.

The transition from 20 mph to 40 mph must include a portion of guideway where a variable frequency inverter feeds LIM sectors, similar to 70 and in conjunction with the LIM segments 20 on the vehicle, accelerate the vehicle from 20 mph up to 40 mph. Then the LSM 10 & 13 takes over. In this option of the system, the LSM and other propulsion elements, must be sized larger than the items described up to this point, as the aerodynamic loads are increased at 40 mph, compared to the loads at 20 mph. Since permanent magnets 16 are used to set up the flux fields on the vehicle, a mechanical means is necessary to physically change the pole pitch on the LSM permanent magnet structure. There are several ways in which this can be accomplished. One way it can be done while the vehicle is in motion and by using the kinetic energy of the vehicle to cause a cam in the guideway surface to double the pole pitch of the LSM PM assembly. Conversely when making the transition from 40 mph to 20 mph the cam reverses LSM the pole pitch to the original spacing. The guideway stator winding pitch is doubled in the 40 mph area.

The desirability of changing speed when out of the downtown area can be easily appreciated. This would extend the usefulness of the system considerably. The vehicles would have to pass through a transition sector where the vehicle spacing and speed are adjusted for the 20 mph or 40 mph guideway.

The elements such as rain and snow obviously could have an adverse effect on the system proposed. Some of the problems can be overcome by partial shelter, proper drains for water, and by special PRT vehicles that automatically traverse the routes as needed to plow snow. Monorail concepts avoid this problem, but at the expense of leaving the vehicle vulnerable to being stranded in case of any system failure. It seems that a "conventional" guideway is worth the weather struggle in view of its ease access for these other aspects.

If any portion of the PRT system becomes inoperable, the central system computer blocks off that section of guideway, so that no vehicles can enter. The passengers can then walk on the guideway to the nearest exit. Special exits (one-way out doors off the guideway) could be provided between stations to permit passengers quick exit to the street.

Since the vehicle never slows or stops until it reaches the destination chosen by the rider, it is possible to obtain fresh air ventilation in warm weather by ram air alone. In addition to this, the intake of the air bearing pump can be inside the vehicle, thus allowing the possibility of forced ventilation. In cold weather the fresh air drawn into the vehicle would be reduced to a minimum. Since all stations are inside buildings, a passenger starts his trip with the ambient air inside the vehicle at whatever the temperature is inside the station, hopefully in the mid-sixty degree Fahrenheit range. As the trip progresses, the vehicle will cool down somewhat, but 500 to 600 watts can be used for radiant heating elements. Also, air used to cool the air pump motor 22 can be diverted into the vehicle, adding approximately 300 more watts.

What I claim as new and desire to secure by Letters Patent of the United States is:

1. In a transportation system having an electrically propelled vehicle, means for controlling the speed and direction of said vehicle and propelling said vehicle comprising in combination:
   a guideway including main line segments as well as ON and OFF ramp segments, which permit stations to be accessed by said vehicle;
   said vehicle has a capacity of approximately 4 to 6 passengers:
   support means comprising air bearings mounted on the bottom of said vehicle;
   lateral support means on sides of said vehicle; said means reacting against side walls of said guideway to provide lateral guidance;
   propulsion means comprising a linear synchronous motor having a primary portion of said motor embedded in the surface of said guideway;
   said primary portion of said linear synchronous motor comprising segments having lengths equal to approximately half the longitudinal dimension of said vehicle;
   said linear synchronous motor primary segment ends are placed in juxtaposition with each other minimizing the size of cooperating secondary members;
   said linear synchronous motor having a primary winding which is excited by polyphase electric power in conjunction with an electronic control, which is adapted to apply said polyphase power on said linear synchronous motor primary segment when said vehicle passes into proper position above said segment and triggers a sensor, which detects when said vehicle is in proper position above said linear synchronous motor primary segment;
   said linear synchronous motor also including field structure of the permanent magnet type which is mounted on the bottom of said vehicle; linear induction motor secondary segments mounted one on each side near said bottom of said vehicle to perform, in cooperation with primary segments mounted in guideway sides to achieve:
   acceleration of said vehicle to guideway synchronous speed;
   steering direction of said vehicle at points in said guideway where the guideway main line has a break in one wall to form another choice of route of travel;
   dynamically braking vehicles at station stops;
   a means of reducing hunting of said linear synchronous motor;
   a means of generating auxiliary electrical power inside said vehicle by using a portion of the tractive effort which propels said vehicle; said means uses only variations in magnetic field intensity; said variations in magnetic field intensity caused by changes in reluctance of magnetic circuit produced by linear motion of said vehicle.

2. A transportation system, as defined in claim 1 wherein:
   lateral guidance of said vehicle is performed by air bearings, said air bearings located on the sides of said vehicle which react against a portion of said guideway's guide rails.

3. A transportation system, as defined in claim 1 wherein:
   power required to support said vehicle is supplied by a brushless DC motor adapted to drive the fan motor of an air pump which supplies air to said air bearings.

4. A transportation system, as defined in claim 3 wherein:
   said electrically propelled vehicle, having only linear motion parts necessary for propulsion, except for said air bearing fan motor, is essentially noiseless; air noise of said air bearings and said fan motor and magnetic noise of the said fan motor, said LSM, said LHIA, being the only noise contributors.

5. A transportation system, as defined in claim 3 wherein:
   air used to cool the air pump motor is diverted into the vehicle in cold weather to provide heat.

6. A transportation system, as defined in claim 1 wherein:
   said vehicle is monocoque construction.

7. A transportation system, as defined in claim 1 wherein:
   said vehicle is propelled and electrical energy generated on-board using an inductor type of alternator; without any mechanical contact whatsoever with any wayside device; said alternator has its working air gap between vehicle and guideway.

8. The apparatus of claim 7 in which:
   the method of generating electrical power on-board the moving vehicle is achieved by the implimentation of a linear alternator.

9. The apparatus of claim 8 in which:
   the alternator is a linear homopolar inductor alternator.

10. A transportation system, as defined in claim 9 wherein:

a phase delay rectifier circuit, which regulates the voltage from the linear inductor alternator, and also provides a method for shedding load to stabilize the linear synchronous motor and provides by this means, extra thrust during frontal wind gusts.

11. The apparatus of claim 10 in which:

the linear inductor alternator is designed with a shorter pole pitch than the linear synchronous motor used for guideway propulsion, thus permitting a fast response time from the phase delay rectifier circuit for purposes of load shedding and stabilization.

12. A transportation system, as defined in claim 7 wherein:

the motor-alternator set, in conjunction with an energy-storage flywheel, can provide sufficient energy to vehicles, which happen to be present on the guideway network, during a commercial power failure, in order to power them to a convenient exit.

13. A transportation system, as defined in claim 1 wherein:

the guideway is suitable, being flat, and with sides of sufficient height to serve as railings, to permit pedestrian traffic.

14. A transportation system as defined in claim 1 wherein:

said linear synchronous motor segments are powered by commercial electric power lines, whose frequency is constant throughout the network, thus eliminating any need to use a closed loop control with: inverters, computers, etc. to maintain vehicle spacing and synchronism on the guideway.

15. A transportation system, as defined in claim 1 wherein:

the vehicle, whose construction is such as to permit doors on both ends of the vehicle, that open in a sliding fashion, similar to elevator doors, and wide enough to permit the entrance of bicycles and wheelchairs; further, the vehicle shall be arranged inside with seats similar to bench seats, that can be easily released to fold up and can fold down to provide adequate space for a bicycle and can provide space for a wheelchair.

16. A transportation system, as defined in claim 1 wherein:

the pair of linear induction motors, whose secondary portions are mounted in a unique manner on the lower section of the vehicle in such a manner as to form an important part of the vehicle structure.

17. A transportation system, as defined in claim 1 wherein:

the pair of linear induction motors perform three separate and distinct functions; acceleration, route switching, and dynamic braking.

18. A transportation system, as defined in claim 1 wherein:

the synchronous speed of the vehicle is changed by changing the LSM pole pitch of the rotor poles, while the vehicle is in motion and passing through a transition area on the guideway to where the LSM stator pitch is doubled.

19. A transportation system, as defined in claim 1 wherein:

the synchronous speed of the vehicle is changed by changing voltage and frequency applied to the LSM primary winding with a motor-alternator set.

20. A transportation system, as defined in claim 1 wherein:

the synchronous speed of the vehicle is changed by changing voltage and frequency applied to the LSM primary winding by the use of a solid state inverter.

21. A transportation system, as defined in claim 20 wherein:

the solid state inverter, in conjunction with storage batteries, can provide sufficient energy to vehicles, which happen to be present on the guideway network, during a commercial power failure, in order to power them to a convenient exit.

22. A transportation system, as defined in claim 1 wherein:

the permanent magnet assemblies on the bottom of the vehicle are prevented from attracting extraneous ferrous particles any farther than the pole face on the bottom of the assembly; particles are prevented from reaching the magnet or the sides of the pole pieces by means of non-magnetic material.

23. A transportation system, as defined in claim 1 wherein:

the permanent magnet assemblies are encapsulated in suitable electrical and mechanical resins to exclude ferrous particles from all except the pole face of the assembly.

24. A transportation system, as defined in claim 1 wherein:

the permanent magnet assemblies are sealed off from the guideway by a non-metallic sheet over the pole face of the assembly; a material such as Teflon is used.

25. A transportation system, as defined in claim 1 wherein:

a rubbing device such as a bristle brush, embedded in the guideway at appropriate positions, as somewhere on the ON ramps, to effectively brush off the extraneous ferrous particles and trap them in a portion of the guideway for later removal and disposal.

26. A transportation system, as defined in claim 1 wherein:

a central computer, constantly knows the location of all vehicles on the guideway and said computer can display by suitable means, such as a cathode ray tube, the location of a defective stator segment whose current drain is either absent or abnormal when activated by said vehicle passing above it.

27. A transportation system, as defined in claim 1 wherein: said electronic control, which can switch three phase power onto the windings of said LSM, with only two main power carrying semiconductors.

28. A circuit, as defined in claim 27 wherein:

diodes in gate circuits of the power semiconductors are light emitting diodes for the additional function of visual inspection, indicating power supply status.

29. A circuit, as defined in claim 27 wherein:

the two triacs are replaced by four SCRs, permitting higher current turn-off capability in the circuit.

30. A transportation system, as defined in claim 1 wherein: said three phase stator winding, which is wound directly on said linear stator segment, in a manner similar to consequent poles and similar to a Gramme ring winding.

31. A transportation system, as defined in claim 1 wherein:
the linear synchronous motor, used for guideway propulsion, has the capability of producing starting torque by virtue of damper windings placed in the pole faces of the permanent magnet field assembly.

32. A transportation system, as defined in claim 1 wherein:
the guideway is provided with openings, drains, and gutters in such a manner as to permit the air from the air bearings on the vehicle to "sweep" water, light snow, leaves, paper, and other debris into these troughs, thus permitting proper operation of the vehicle and easy removal of foreign matter from the guideway.

33. A transportation system, as defined in claim 1 wherein:
the vehicle ends are designed as crushable structures to help provide protection to occupants and objects in collision.

34. A transportation system, as defined in claim 1 wherein:
switch points in the guideway are themselves constructed as crushable structures, at the point of division, to provide protection to vehicle passengers.

35. A transportation system, as defined in claim 1 wherein: power wires for said guideway held LSM stator assemblies are internal to the guideway structure away from all possible contact with said vehicles or passengers.

* * * * *